US011880889B2

(12) United States Patent
Caldwell

(10) Patent No.: US 11,880,889 B2
(45) Date of Patent: *Jan. 23, 2024

(54) METER FOR GRAPHICALLY REPRESENTING RELATIVE STATUS IN A PARENT-CHILD RELATIONSHIP AND METHOD FOR USE THEREOF

(71) Applicant: MX Technologies, Inc., Lehi, UT (US)

(72) Inventor: Ryan Caldwell, Lehi, UT (US)

(73) Assignee: MX Technologies, Inc., Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,794

(22) Filed: Jul. 13, 2020

(65) Prior Publication Data

US 2020/0342542 A1 Oct. 29, 2020

Related U.S. Application Data

(63) Continuation of application No. 13/573,356, filed on Sep. 11, 2012, now Pat. No. 10,713,730.

(51) Int. Cl.
G06Q 40/12 (2023.01)
G06T 11/20 (2006.01)
G06Q 40/02 (2023.01)

(52) U.S. Cl.
CPC .......... *G06Q 40/12* (2013.12); *G06Q 40/02* (2013.01); *G06Q 40/128* (2013.12); *G06T 11/206* (2013.01)

(58) Field of Classification Search
CPC ........ G06F 40/12; G06F 40/02; G06F 40/128; G06T 11/206
See application file for complete search history.

(56) References Cited

U.S. PATENT DOCUMENTS

| 6,111,573 | A | * | 8/2000 | McComb | ............... | G09G 5/363 |
| | | | | | | 715/764 |
| 7,050,997 | B1 | | 5/2006 | Wood, Jr. | | |
| 7,107,268 | B1 | * | 9/2006 | Zawadzki | ............. | G06Q 10/06 |
| | | | | | | 707/999.009 |

(Continued)

OTHER PUBLICATIONS

Microsoft, Microsoft Computer Dictionary 494 (5th ed. 2002) (Year: 2002).*

(Continued)

*Primary Examiner* — Justin R. Blaufeld
(74) *Attorney, Agent, or Firm* — Kunzler Bean & Adamson

(57) ABSTRACT

Apparatuses, methods, systems, and program products are disclosed for graphically representing relative status in a parent-child relationship. An apparatus includes a processor and a memory that stores code executable by the processor to generate a plurality of graphical representations of budgets for tracking a user's income and expenses, determine a parent-child relationship between each of the plurality of budgets to determine each parent budget and each child budget associated with each parent budget, and present each graphical representation of a parent budget of the plurality of budgets and a budget meter within each graphical representation of the parent budget that represents a portion of the parent budget that has been used according to the child budgets of the parent budget.

13 Claims, 4 Drawing Sheets

(56) References Cited

U.S. PATENT DOCUMENTS

| | | | | |
|---|---|---|---|---|
| 7,792,748 | B1* | 9/2010 | Ebersole | G06Q 20/108 345/619 |
| 8,170,933 | B1* | 5/2012 | Cameron | G06Q 40/12 705/30 |
| 8,438,091 | B1* | 5/2013 | Berman | G06Q 40/00 705/40 |
| 8,589,273 | B2 | 11/2013 | Creeden et al. | |
| 9,424,536 | B2 | 8/2016 | Bear et al. | |
| 10,564,990 | B1* | 2/2020 | Kapulkin | G06F 9/453 |
| 10,713,730 | B2* | 7/2020 | Caldwell | G06Q 40/128 |
| 2002/0191026 | A1* | 12/2002 | Rodden | G09G 5/14 715/779 |
| 2003/0137541 | A1* | 7/2003 | Massengale | G06F 3/04847 715/764 |
| 2003/0210279 | A1* | 11/2003 | Masuda | G06Q 30/06 715/810 |
| 2005/0222881 | A1* | 10/2005 | Booker | G06Q 10/06375 705/7.38 |
| 2005/0229110 | A1* | 10/2005 | Gegner | G16H 40/63 715/792 |
| 2006/0031149 | A1 | 2/2006 | Lyons et al. | |
| 2006/0236264 | A1* | 10/2006 | Cain | G06F 3/0481 715/788 |
| 2007/0149252 | A1* | 6/2007 | Jobs | H04M 15/83 455/566 |
| 2007/0260532 | A1* | 11/2007 | Blake, III | G06Q 40/00 705/35 |
| 2010/0153242 | A1* | 6/2010 | Preston | G06Q 40/12 705/30 |
| 2010/0268629 | A1* | 10/2010 | Ross | G06Q 10/10 705/35 |
| 2011/0099063 | A1* | 4/2011 | Clemmons | G06Q 30/02 705/35 |
| 2012/0084168 | A1* | 4/2012 | Adair | G06Q 30/08 705/26.3 |
| 2012/0130869 | A1* | 5/2012 | Shergill | G06Q 40/12 705/30 |
| 2012/0130870 | A1* | 5/2012 | Shergill | G06Q 40/12 705/30 |
| 2012/0215464 | A1* | 8/2012 | Daubney | G01K 17/06 702/182 |
| 2013/0055136 | A1* | 2/2013 | Aaron | H04M 15/83 715/772 |
| 2013/0103580 | A1* | 4/2013 | Ventura | G06Q 40/12 705/40 |
| 2013/0282542 | A1* | 10/2013 | White | G06Q 40/00 705/35 |

OTHER PUBLICATIONS

Wilbert O. Galitz, The Essential Guide to User Interface Design 162 (2nd Ed. 2002). (Year: 2002).*

Jesse Mecham, "YNAB 4: Spending by Category & Spending by Payee" (available at <youneedabudget.com/blog/2012/ynab-4-spending-by-category-spending-by-payee/>) (Year: 2012).*

Mikhail_grachikov. "Deposit Photos—Stock Illustration #80752382." Deposit Photos., Jan. 18, 2012 [online], [retrieved on Jul. 8, 2016]. Retrieved from the Internet <URL: http://depositphotos.com/search/control-hub.html?AVXU2sVNbX8y4zPKyYK_=&qview=80752382>.

U.S. Appl. No. 29/553,409 Notice of Allowance, dated Jul. 14, 2016.

U.S. Appl. No. 29/553,418 Notice of Allowance, dated Jul. 21, 2016.

Derr, Andrew. "Shutter Stock—Image ID: 255006682." Shutter Stock., Jul. 11, 2012 [online], [retrieved on Jul. 8, 2016]. Retrieved from the Internet <URL: http://www.shutterstock.com/pic-255006682.html>.

3Art, Shutter Stock—Image ID: 300077855.: Shutter Stock., May 24, 2011 [online], [retrieved on Jul. 8, 2016]. Retrieved from the Internet <URL: http://www.shutterstock.com/pic-300077855.html>.

U.S. Appl. No. 13/507,602 Office Action dated Apr. 3, 2017.

L'Hostis et al., Vendor Landscape: Pick The Right Digital Money Management Technologies Tools And Technology: The Digital Money Management Playbook, Mar. 17, 2016, Forrester.com, Cambridge, MA.

U.S. Appl. No. 13/507,601 Non-Final Office Action dated Jun. 30, 2017.

U.S. Appl. No. 13/507,601 Office Action dated Jan. 12, 2018.

U.S. Appl. No. 13/507,602 Examiner's Answer dated Jan. 3, 2018.

U.S. Appl. No. 13/507,601 Examiner's Answer dated Apr. 22, 2019.

U.S. Appl. No. 29/553,412 Notice of Allowance, dated Jul. 27, 2016.

U.S. Appl. No. 29/553,415 Notice of Allowance, dated Jul. 25, 2016.

U.S. Appl. No. 29/553,416 Notice of Allowance, dated Jul. 29, 2016.

U.S. Appl. No. 29/553,422 Notice of Allowance, dated Jul. 25, 2016.

U.S. Appl. No. 29/553,425 Notice of Allowance, dated Jul. 29, 2016.

U.S. Appl. No. 29/553,431 Notice of Allowance, dated Jul. 26, 2016.

U.S. Appl. No. 29/553,434 Notice of Allowance, dated Jul. 29, 2016.

U.S. Appl. No. 29/553,436 Notice of Allowance, dated Jul. 26, 2016.

U.S. Appl. No. 16/735,631 Office Action dated Nov. 13, 2020.

U.S. Appl. No. 29/553,437 Notice of Allowance, dated Jul. 25, 2016.

U.S. Appl. No. 13/507,602, Final Office Action, dated Sep. 6, 2016.

U.S. Appl. No. 13/507,602, Notice of Allowance, dated Oct. 15, 2019.

U.S. Appl. No. 16/735,631 Office Action, dated Jun. 2, 2021.

U.S. Appl. No. 16/945,691 Office Action, dated Aug. 27, 2021.

U.S. Appl. No. 16/735,631 Final Office Action, dated Sep. 16, 2021.

U.S. Appl. No. 16/945,691 Final Office Action, dated Feb. 2, 2022.

U.S. Appl. No. 16/735,631 Office Action, dated Feb. 17, 2022.

U.S. Appl. No. 16/945,691 Notice of Allowance, dated Jul. 25, 2022.

U.S. Appl. No. 16/735,631 Notice of Allowance, dated Aug. 26, 2022.

Nathan Yau, How to Make Bubble Charts, Nov. 23, 2010, Flowing Data, flowingdata.com.

* cited by examiner

METER FOR GRAPHICALLY REPRESENTING RELATIVE STATUS IN A PARENT-CHILD RELATIONSHIP AND METHOD FOR USE THEREOF

CROSS-REFERENCES TO RELATED APPLICATIONS

This is a continuation application of and claims priority to U.S. patent application Ser. No. 13/573,356 entitled "METER FOR GRAPHICALLY REPRESENTING RELATIVE STATUS IN A PARENT-CHILD RELATIONSHIP AND METHOD FOR USE THEREOF" and filed on Sep. 11, 2012, for Ryan Caldwell, which is incorporated herein by reference.

BACKGROUND

In many fields, parent-child relationships exist. It is desirable to be able to graphically represent the status of a child with respect to a parent in the parent-child relationship.

In the prior art, meters or gauges were used to depict the status of a single entity, such as the amount of fuel in a fuel tank. In addition, minor work was done depicting percentages, such as a bar graph which can show current progress versus a target number. However, the prior art failed to address the need for the ability to graphically represent the status of a parent-child relationship.

SUMMARY

Apparatuses, methods, systems, and program products are disclosed for graphically representing relative status in a parent-child relationship. An apparatus, in one embodiment, includes a processor and a memory that stores code executable by the processor to generate a plurality of graphical representations of budgets for tracking a user's income and expenses, determine a parent-child relationship between each of the plurality of budgets to determine each parent budget and each child budget associated with each parent budget, and present each graphical representation of a parent budget of the plurality of budgets and a budget meter within each graphical representation of the parent budget that represents a portion of the parent budget that has been used according to the child budgets of the parent budget.

A computer program product, in one embodiment, includes a computer readable storage medium having program code embodied therein. In certain embodiments, the program code is readable/executable by a processor for generating a plurality of graphical representations of budgets for tracking a user's income and expenses, determining a parent-child relationship between each of the plurality of budgets to determine each parent budget and each child budget associated with each parent budget, and presenting each graphical representation of a parent budget of the plurality of budgets and a budget meter within each graphical representation of the parent budget that represents a portion of the parent budget that has been used according to the child budgets of the parent budget.

In one embodiment, an apparatus includes means for generating a plurality of graphical representations of budgets for tracking a user's income and expenses, means for determining a parent-child relationship between each of the plurality of budgets to determine each parent budget and each child budget associated with each parent budget, and means for presenting each graphical representation of a parent budget of the plurality of budgets and a budget meter within each graphical representation of the parent budget that represents a portion of the parent budget that has been used according to the child budgets of the parent budget.

DETAILED DESCRIPTION

For the purposes of this document, an example concerning budgeting is utilized. This example is used for illustration purposes and the scope of the invention is not limited to budgeting.

In the field of personal financial management ("PFM"), it is desirable to provide budgeting systems which allow users to budget for and track their income and expenses. The reasons why budgeting is desirable are omitted from this document. In order to provide explanatory examples that are useful to help the reader understand the invention, personal budgeting software examples are provided. The invention may be used in a wide variety of fields where parent-child relationships exist, so these examples should be considered exemplary rather than limiting in nature.

Figure 1:
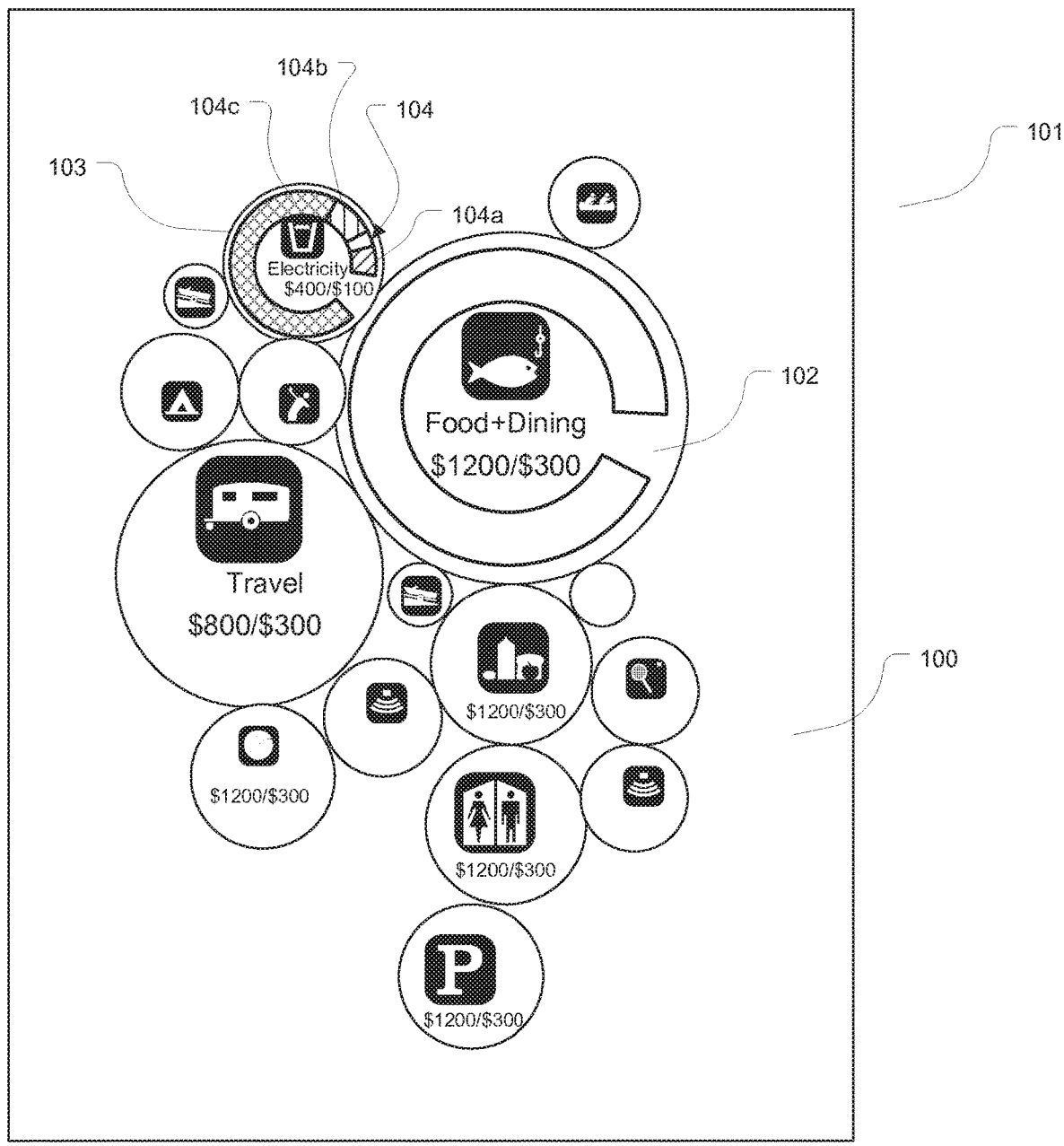
FIG. 1 depicts an explanatory diagram of parent-child relationships in a budgeting computer software package.

Referring to FIG. 1, an explanatory diagram 100 is provided that shows an example screen 101 of a mobile device running a computer software budgeting program. In this example, initially only parent categories will be displayed. In this example, the categories are depicted as bubbles. If the graphical representation for a particular parent budget is large enough when shown on a computer display device, then the logo name, and amount of that parent budget category can be shown, as well as the percent of that budget used to date. For example, the Food+Dining budget 102 is displayed with a logo of a sandwich, a $1200 expense amount displayed, $900 amount displayed, and a percentage usage of 125% displayed. This allows a user to immediately acquire salient budget information from the screen of a computer, such as a mobile or handheld device. As the budget amount shrinks, the software may (or may not) also shrink the corresponding graphical representation. In that event, the software can show as much relevant data as possible, but some items may need to be omitted.

From the parent budget, the user can see the status of child budgets through a child meter. For example, a child meter 103 is provided that depicts a budget for electricity expenses. This example shows the budget as a circular bubble representation although other shapes could be used as well. A light bulb logo is shown to indicate the concept of electricity usage. The electricity budget is shown to have a $400 budget with $100 of that budget used to date due to electricity bills. Continuing with this example, the parent budget of electricity 103 has its children's status indicated at the parent level through a budget meter 104. The budget meter exemplified in this instance is a circular ring within the parent budget widget. The budget meter can display:

(a) Portion of spending of a child budget within the parent budget that has exceeded its budgeted amount 104a (also can be indicated by a color such as red), (b) Portion of spending of a child budget within the parent budget that is close to exceeding its budgeted amount 104b (also can be indicated by a color such as yellow), and (c) Portion of a child budget within the parent budget that is within its budgeted amount 104c (also can be indicated by a color such as green).

In the example of FIG. 1, if the parent budget category is over budget, such as with budget 102, then the children are not displayed. If desired, the software could be written to display them.

Figure 2:
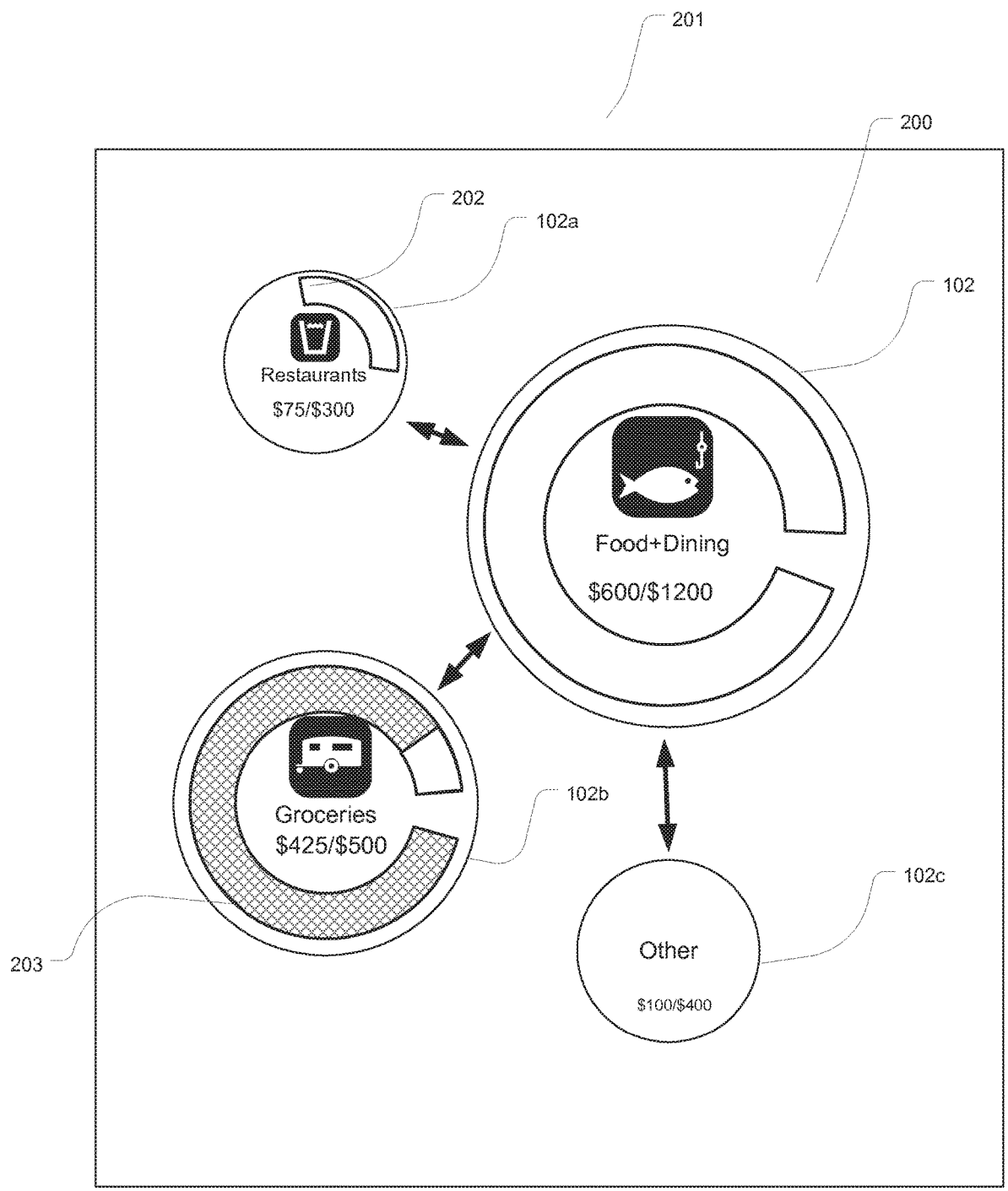
FIG. 2 depicts an explanatory diagram of parent-child relationships per FIG. 1.

Referring to FIG. 2, an explanatory diagram 200 is provided that shows an example screen 201 of a mobile device running a computer software budgeting program, per FIG. 1. In this example, to see child budgets within the parent budget, the user simply drills down into the parent. In this example, that may be achieved by clicking on the parent budget 102 in order to access child budgets 102a, 102b, 102c, etc. For 102a, a Restaurants budget meter 202 is depicted showing about that proportion of the Restaurants child budget that has been utilized, such as ¼ or 25 percent. For 102b Groceries, a child budget meter 203 is provided that graphically depicts the proportion of the child budget as been used, such as about $425 out of $500 or 85 percent. When the parent budget is drilled into, the child budgets may be displayed connected to it if desired. In this particular example, the "Other" child budget 102c represents spending that was not budgeted for.

Figure 3:
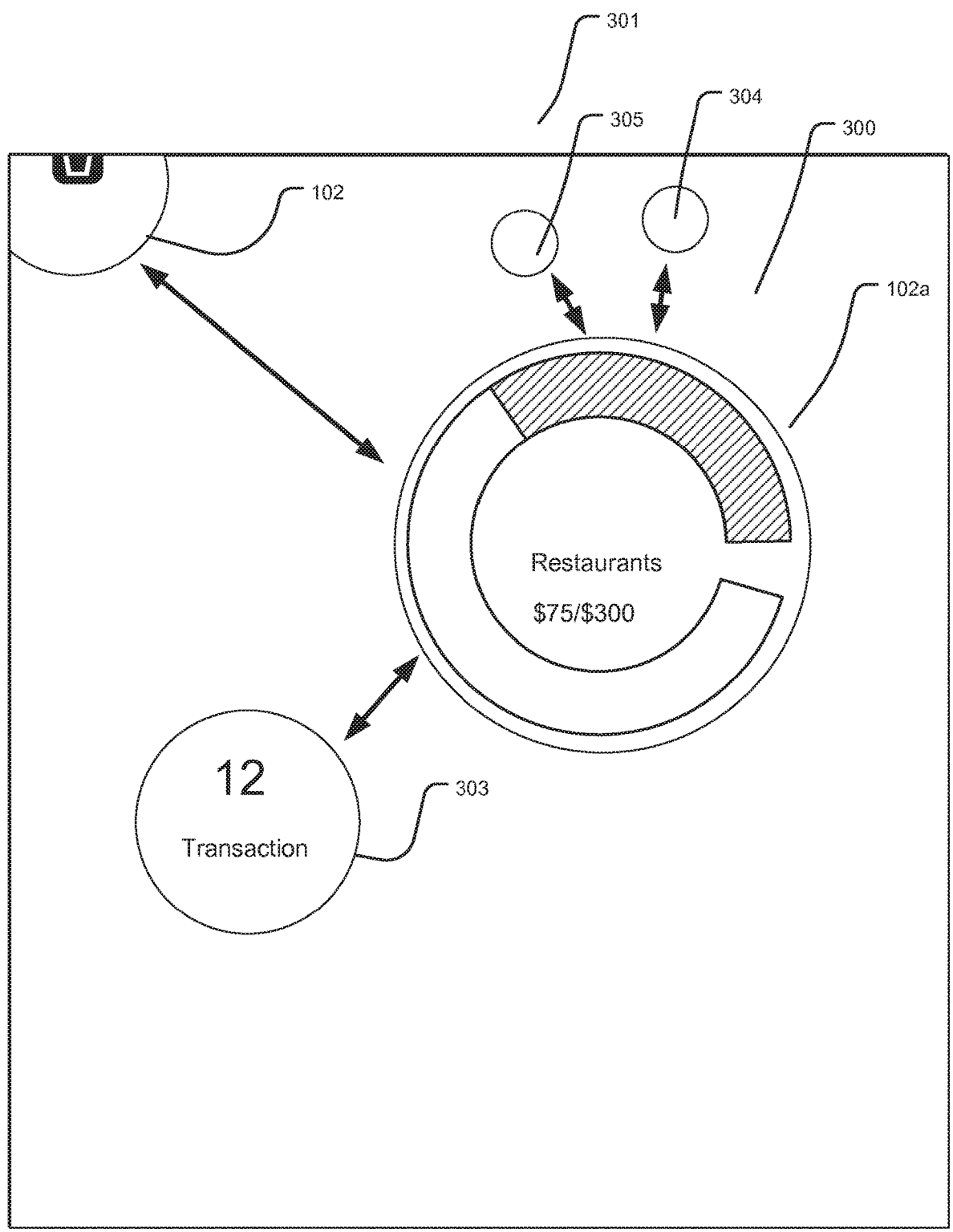
FIG. 3 depicts an explanatory diagram of parent-child relationships per FIGS. 1 and 2.

Referring to FIG. 3, an explanatory diagram 300 is provided that shows an example screen 301 of a mobile device running a computer software budgeting program, per FIGS. 1 and 2. In this example, the user has elected to view details of a child budget 102a—Restaurants. $75 of the $300 restaurant budget has been used, for a 25% usage rate. Within the child budget, there are 12 transactions 303 which can be drilled into if desired. From this page, the user can delete 304 the budget or edit 305 its details.

Figure 4:
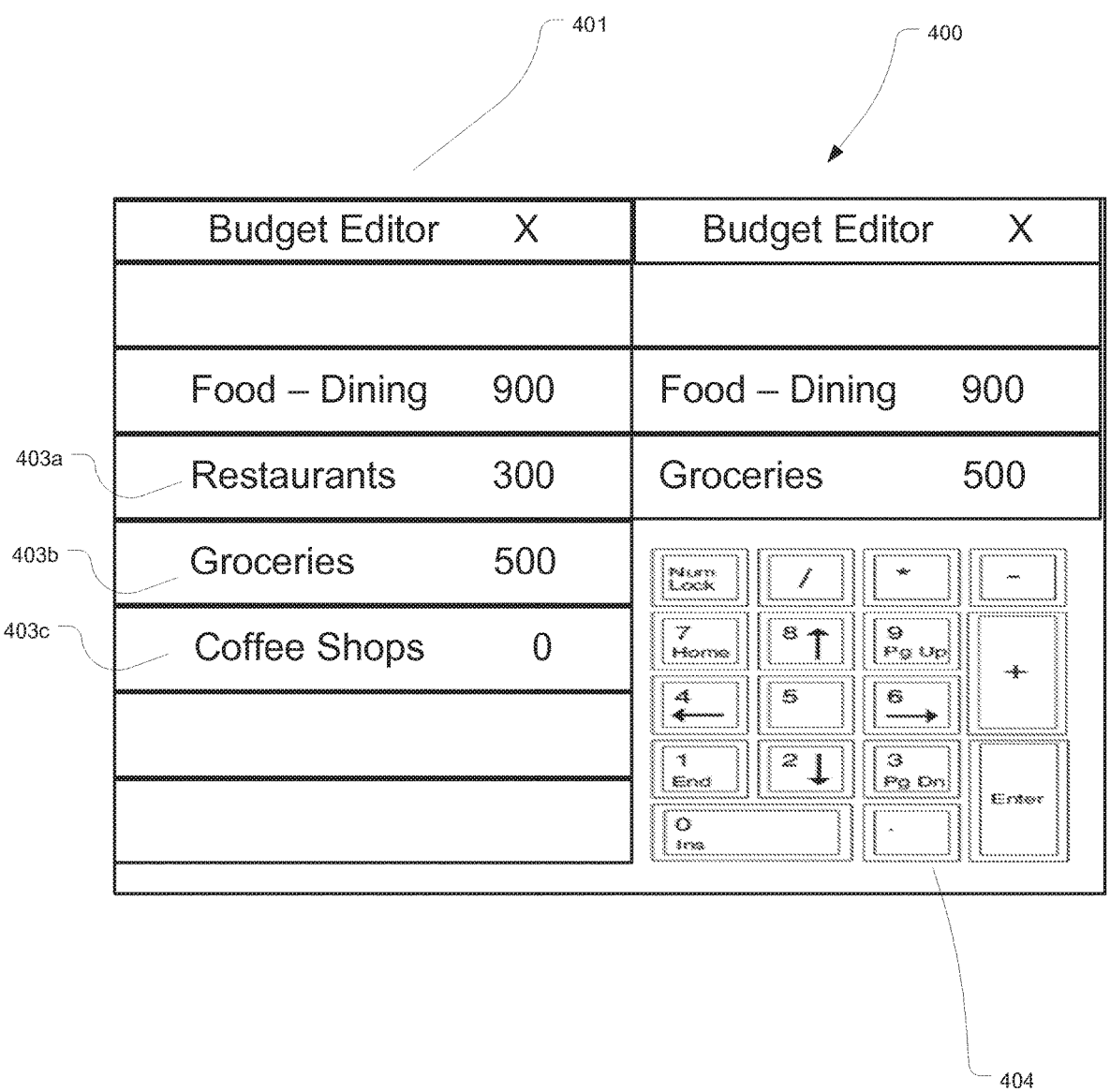
FIG. 4 depicts an explanatory diagram of parent-child relationships per FIGS. 1-3, with line items shown.

Referring to FIG. 4, an explanatory diagram 400 is provided that shows an example screen 401 of a mobile device running a computer software budgeting program, per FIGS. 1-3. In this example, the user has chosen to edit 305 the details of the budget 102 a. Editing the budget causes the parent budget and the children to be listed with the ability to in-line edit each value. For example, in 401 we see the ability to edit individual transactions 403a, 403b and 403c by use of a keypad 404.

For the purposes of this document, a meter for use in indicating the status of a child within a parent-child relationship has been discussed. The meter may be used to meter, quantify, measure, depict, estimate, gauge, approximate, judge, calculate, figure, compare, or otherwise evaluate the status of the parent-child relationship. In the example of FIG. 1, the electricity budget 103 has a parent-child relationship meter 104 that graphically indicates 25% of the electricity budget has been used by shading 25% or 90 degrees of the 360 degree budget meter. Other graphic methods may be used to indicate the parent-child relationship status as well.

The meter has been discussed so far are a device, such as a graphical representation of the relative status of a parent-child relationship. But the meter can also be discussed as a method. When considering the meter as a method, it could be considered a method for graphically displaying the status of a child in a parent-child relationship by displaying a meter that shows the entire potential of a parent-child relationship, as well as graphically depicting the progress of the child in reaching that full potential. That progress or status may be considered a percentage or a proportion if desired.

The invention can be implemented as software that runs on a digital computer. The state of technology and trends as of the time of writing this document indicates that digital computers running software will be a preferred implementation for many years to come. For the purposes of this document, the term "digital computer" includes desktop computers, laptop computers, tablet computers, hand-held mobile electronic devices (including so-called smart phones), other mobile electronic devices, networked computers, mainframe computers, and other computing devices. Other computing devices may include analog computing devices, quantum computing devices, biological computing devices and other computing devices. Although the invention can be implemented as software operating on a computing device, the invention can also be implemented as firmware or it may be implemented in hardware or otherwise as desired. Such implementations are intended to be within the scope of the invention. Commonly a computing device for using the invention will include a display device such as a screen or other image on which information can be displayed to a user, an input device through which a user can control the computing device, and a processor for carrying out computations as required by the invention. The computing device may also include a means for carrying wireless transmission and receipt of data, dynamic memory, static memory, a power source such as a battery, and other features.

While the present invention has been described and illustrated in conjunction with a specific embodiment, those skilled in the art will appreciate that variations and modifications may be made without departing from the principles of the invention as herein illustrated, described, and claimed. The present invention may be embodied in other specific forms without departing from its spirit or essential characteristics. The described embodiment is to be considered in all respects as only illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. An apparatus, comprising:
   a processor; and
   a memory that stores code executable by the processor to:
      generate a plurality of graphical representations of budgets for a user, each of the plurality of graphical representations associated with a budget category;
      determine a parent-child relationship between each of the plurality of budgets to determine each parent budget and each child budget associated with each parent budget;
      present each graphical representation of a parent budget of the plurality of budgets and a budget meter within each graphical representation of the parent budget that represents a portion of the parent budget that has been used according to the child budgets of the parent budget, wherein each parent budget is graphically presented using a respective full circular graphical representation and the budget meter is presented as at least a portion of a circular ring within the full circular graphical representation of the parent budget and does not fully overlap a portion of the graphical representations of the parent budgets;

determine an amount of additional information to present based on a size of a graphical representation of at least one parent budget as presented on a display;

present the additional information associated with the graphical representation of the at least one of the parent budget;

receive a selection of a presented graphical representation of a parent budget;

present graphical representations of the child budgets of the selected parent budget and graphical indications of connectedness between the graphical representation of the selected parent budget and the graphical representations of the child budgets in response to receiving the selection of the graphical representation of the parent budget;

dynamically resize the graphical representation of the at least one of the parent budget in response to a change in a budget amount for the at least one of the parent budget;

determine the amount of additional information to present based on the resized graphical representation of the at least one of the parent budget; and present the additional information associated with the resized graphical representation of the at least one of the parent budget.

2. The apparatus of claim 1, wherein the code is further executable by the processor to present a graphical representation of a child budget that includes spending amounts that are not budgeted for in the parent budget.

3. The apparatus of claim 1, wherein the code is further executable by the processor to present a representation of a number of transactions for a child budget, the transactions being selectable from the representation.

4. The apparatus of claim 1, wherein the budget meter represents one of:
a portion of spending of a child budget within the parent budget that has exceeded the child budget's budgeted amount;
a portion of spending of a child budget within the parent budget that is close to exceeding the child budget's budgeted amount; and
a portion of spending of a child budget within the parent budget that is within the child budget's budgeted amount.

5. The apparatus of claim 1, wherein the code is executable by the processor to dynamically resize the graphical representations of the budgets in response to a change in a budget amount for each budget.

6. The apparatus of claim 1, wherein the code is executable by the processor to modify an existing budget in response to a user selecting to edit the budget from the graphical presentation of the budgets.

7. The apparatus of claim 6, wherein the code is executable by the processor to present an interface for editing a parent budget, the interface including a list of child categories for the parent budget that are each dynamically editable inline.

8. The apparatus of claim 7, wherein editing a parent budget comprises modifying one or more of a category name, a total budget amount, a child category name, and a child category budget amount.

9. The apparatus of claim 1, wherein the additional information comprises at least one of a logo, a budget name, an amount of the parent budget category, and a percent of the budget that has been used as represented by the budget meter.

10. A computer program product, comprising a non-transitory computer readable storage medium having program code embodied therein, the program code readable/executable by a processor for:
generating a plurality of graphical representations of budgets for a user, each of the plurality of graphical representations associated with a budget category;
determining a parent-child relationship between each of the plurality of budgets to determine each parent budget and each child budget associated with each parent budget;
presenting each graphical representation of a parent budget of the plurality of budgets and a budget meter within each graphical representation of the parent budget that represents a portion of the parent budget that has been used according to the child budgets of the parent budget, wherein each parent budget is graphically presented using a respective full circular graphical representation and the budget meter is presented as at least a portion of a circular ring within the full circular graphical representation of the parent budget and does not fully overlap a portion of the graphical representations of the parent budgets;
determining an amount of additional information to present based on a size of a graphical representation of at least one parent budget as presented on a display;
presenting the additional information associated with the graphical representation of the at least one of the parent budget;
receiving a selection of a presented graphical representation of a parent budget;
presenting graphical representations of the child budgets of the selected parent budget and graphical indications of connectedness between the graphical representation of the selected parent budget and the graphical representations of the child budgets in response to receiving the selection of the graphical representation of the parent budget;
dynamically resizing the graphical representation of the at least one of the parent budget in response to a change in a budget amount for the at least one of the parent budget;
determining the amount of additional information to present based on the resized graphical representation of the at least one of the parent budget; and
presenting the additional information associated with the resized graphical representation of the at least one of the parent budget.

11. The computer program product of claim 10, wherein the code is further executable by the processor to present a graphical representation of a child budget that includes spending amounts that are not budgeted for in the parent budget.

12. The computer program product of claim 10, wherein the code is further executable by the processor to present a representation of a number of transactions for a child budget, the transactions being selectable from the representation.

13. A method, comprising:
generating a plurality of graphical representations of budgets for a user, each of the plurality of graphical representations associated with a budget category;
determining a parent-child relationship between each of the plurality of budgets to determine each parent budget and each child budget associated with each parent budget;
presenting each graphical representation of a parent budget of the plurality of budgets and a budget meter within each graphical representation of the parent budget that represents a portion of the parent budget that has been used according to the child budgets of the parent budget, wherein each parent budget is graphically presented using a respective full circular graphical representation and the budget meter is presented as at least a portion of a circular ring within the full circular graphical representation of the parent budget and does not fully overlap a portion of the graphical representations of the parent budgets;

determining an amount of additional information to present based on a size of a graphical representation of at least one parent budget as presented on a display;

presenting the additional information associated with the graphical representation of the at least one of the parent budget;

receiving a selection of a presented graphical representation of a parent budget;

presenting graphical representations of the child budgets of the selected parent budget and graphical indications of connectedness between the graphical representation of the selected parent budget and the graphical representations of the child budgets in response to receiving the selection of the graphical representation of the parent budget;

dynamically resizing the graphical representation of the at least one of the parent budget in response to a change in a budget amount for the at least one of the parent budget;

determining the amount of additional information to present based on the resized graphical representation of the at least one of the parent budget; and presenting the additional information associated with the resized graphical representation of the at least one of the parent budget.

* * * * *